(12) United States Patent
Guesnon et al.

(10) Patent No.: US 6,536,480 B2
(45) Date of Patent: Mar. 25, 2003

(54) HIGH-PRESSURE PIPE ELEMENT MADE OF A HOODED TUBE

(75) Inventors: Jean Guesnon, Chatou (FR); Christian Gaillard, Rueil Malmaison (FR); Pierre Schaeffner, Le Haillan (FR); Christophe Blois, Bordeaux (FR)

(73) Assignees: Institut Francais du Petrole, Rueil-Malmaison cedex (FR); E.A.D.S. Composites Aquitaine, Salaunes (FR)

( * ) Notice: Subject to any disclaimer, the term of this patent is extended or adjusted under 35 U.S.C. 154(b) by 0 days.

(21) Appl. No.: 10/202,095

(22) Filed: Jul. 25, 2002

(65) Prior Publication Data

US 2003/0024587 A1 Feb. 6, 2003

(30) Foreign Application Priority Data

Aug. 1, 2001 (FR) ............................................. 01 10360

(51) Int. Cl.$^7$ ................................................. F16L 9/04
(52) U.S. Cl. ........................ 138/172; 138/155; 138/99; 156/187
(58) Field of Search ................................ 138/172, 155, 138/99, 175, DIG. 1; 156/94, 187

(56) References Cited

U.S. PATENT DOCUMENTS

| | | | |
|---|---|---|---|
| 3,880,195 A | 4/1975 | Goodrich | 138/172 |
| 5,787,934 A | * 8/1998 | Flueler | 138/172 |
| 6,276,401 B1 | * 8/2001 | Wilson | 138/172 |
| 6,450,207 B2 | * 9/2002 | Villatte et al. | 138/172 |

FOREIGN PATENT DOCUMENTS

GB  2265200  9/1993

OTHER PUBLICATIONS

Blanc et al "Composites Cut Riser Weight by 30/40%, Mass by 20–30% Composite Drilling Risers Blazing Trail For Production And Tensioner Use" Offshore, Petroleum Publishing Co., Tulsa, US vol 58, No. 1, 1998 pp 54, 58, 60 XP000766881.

* cited by examiner

Primary Examiner—Patrick Brinson
(74) Attorney, Agent, or Firm—Antonelli, Terry, Stout & Kraus, LLP

(57) ABSTRACT

High-pressure pipe element made of a hooded tube for making lines referred to as kill lines and choke lines that equip oil production installations, notably offshore. The high-pressure pipe element is an assembly consisting of two connections (3) and (4) respectively welded to the two ends of a metallic tube (1). The metallic assembly is hooped. Hooping (2) covering tube (1) comprises a sufficient number of hooping layers to withstand a determined internal pressure. Transition zones (5) and (7) in the vicinity of the welds comprise additional hooping layers.

8 Claims, 2 Drawing Sheets

HIGH-PRESSURE PIPE ELEMENT MADE OF A HOODED TUBE

FIELD OF THE INVENTION

The present invention relates to the sphere of high-pressure pipes intended to equip an oil drilling and/or production installation. More precisely, it relates to an application of the hooping technique for reinforcing metal tubes by means of composite reinforcing elements.

BACKGROUND OF THE INVENTION

The hooping technique consists in winding a reinforcing element, generally in form of a fiber band coated with a polymer, around a metallic core in order to increase the resistance of the core to the internal pressure without increasing its weight significantly, considering the low weight of the bands.

The core can be a metal tube, for example made of steel. The reinforcing element is an elongate element. It can have the shape of a strip, of a wire, or preferably of a series of wires or wick coated with a polymer matrix.

The reinforcing element can be wound around the core while introducing a tension therein. Thus, the reinforcing element wound around the core is subjected to a tensile stress, which causes the metallic core to be stressed. The prestress undergone by the core is similar to the prestress that would be produced by an outside collapse pressure.

Oil is produced from an offshore reservoir using a pipe generally referred to as riser, which allows the wellhead installed at the sea bottom to be connected to the surface. The riser is an extension of the tubing carrying the oil from the well bottom to the wellhead. The riser is provided with at least two auxiliary lines called kill line and choke line, whose main function is to establish a hydraulic connection between the sea surface and the wellhead at the sea bottom. More particularly, the auxiliary lines allow to supply the well with fluid by circulating below the closed blowout preventer, and/or to discharge a fluid from the well without passing through the inside of the riser which is not high pressure resistant. The fluid conveyed, resulting from an influx in an underground reservoir, can circulate at a pressure of 700 bars.

The present invention proposes using hooped tubes so as to reduce the weight of the auxiliary lines. Its aim is to provide a simple and economical embodiment of a high-pressure pipe element made of a hooped tube.

SUMMARY OF THE INVENTION

The present invention relates to a high-pressure pipe element comprising at least one hooping layer on a metallic core. The core consists of a main part to which two connection means are welded at each end. The main part comprises a number of hooping layers inducing a determined prestress in the core, and the pipe comprises additional hooping layers in a zone stretching on either side of the two welds.

According to the present invention, the additional hooping layers can stretch over at least 50 mm of the main part.

The ends of the connection means may not be hooped and can have a sufficient thickness to withstand at least the same internal pressure as the hooped main part.

The outer surface of the connection means can form a cone between the main part and each end of the connection means. The cones can be covered at least partly by the additional hooping means.

According to the present invention, the pipe element is coated over the total outer surface thereof with a protective layer made of glass fiber embedded in a coloured polyamide matrix.

The pipe element according to the present invention can be used to make an auxiliary line of a drilling riser, and the auxiliary line can be a kill line, a choke line, a booster line or a mud return line.

BRIEF DESCRIPTION OF THE DRAWINGS

Other details, features and advantages of the invention will be clear from reading the description hereafter of a non limitative embodiment example, with reference to the accompanying drawings wherein.

DETAILED DESCRIPTION

Figure 1:
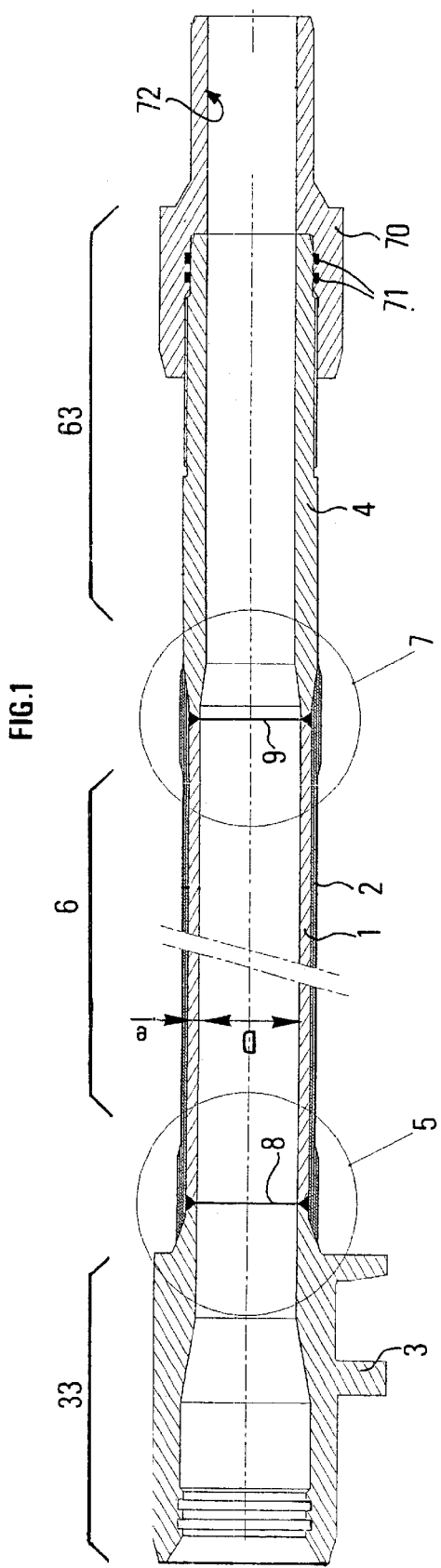
FIG. 1 shows a pipe element made of a hooped tube according to the invention.

FIG. 1 shows a high-pressure pipe element made of a hooped tube according to the invention. This element comprises four different parts: a metal tube 1 or core, a first connection 3, a second connection 4 and hooping layers 2. Tube 1 has an inside diameter D and a thickness e which are substantially constant over the total length of tube 1. Connections 3 and 4 are tubular parts obtained for example by machining, forging or molding. According to the present invention, metal tube 1 and connections 3 and 4 are manufactured independently of one another. Tube 1 is generally manufactured from a rolled blank. Then, connections 3 and 4 are welded onto tube 1. Connection 3 is welded to one end of tube 1, the weld being shown by reference number 8 in FIG. 1. Then, connection 4 is welded to the other end of tube 1, the weld being shown by reference number 9 in FIG. 1. A metallic assembly is thus obtained. Winding a reinforcing element around this metallic assembly allows hooping 2 of the metallic assembly to be obtained. The reinforcing element can be made from a polyamide matrix reinforced by carbon fibers. The hoop comprises a sufficient number of layers for the tube to withstand a determined internal pressure. The metallic assembly consisting of connections 3, 4 and tube 1 is hooped over the total length thereof, except for its ends part 33 of connection 3 and part 63 of connection 4, which may cooperate with other elements, are not hooped.

The hooping principle according to the invention consists in inducing a compressive prestress in the metal core or tube 1 by means of the composite reinforcing bands. Thus prestressed, the internal pressure resistance capacity of tube 1 is increased since the effective pressure stress is reduced by the prestress value induced upon manufacture. In other words, the allowable pressure in this pipe element is increased by the internal pressure value that would equalize the hooping pressure.

In the description hereafter, what is referred to as<< first transition zone>> is the zone surrounded by circle 5 which stretches on either side of weld 8. What is referred to as<< second transition zone>> is the zone surrounded by circle 7 which stretches on either side of weld 9. On pipe element 1, the zone located between the first and the second transition zone is referred to as<< current zone>>; it is shown by reference number 6 in FIG. 1.

Current zone 6 comprises a determined number of hooping layers allowing to withstand a determined internal pressure. The number of hooping layers is generally constant over the total length of current zone 6.

Welds 8 and 9 are spots where a heterogeneity is observed, and potentially a fatigue brittleness. The purpose of the present invention is to overcome these mechanical risks in transition zones and to increase the internal pressure resistance of the hooped tube in the vicinity of welds 8 and 9.

Thus, a pipe element according to the present invention has the advantage of being more resistant to the internal pressure in the vicinity of transition zones 5 and 7 than in the vicinity of current zone 6. Transition zones 5 and 7 are therefore covered with a hooping with a higher number of layers than the number of layers covering current zone 6.

Figure 2:
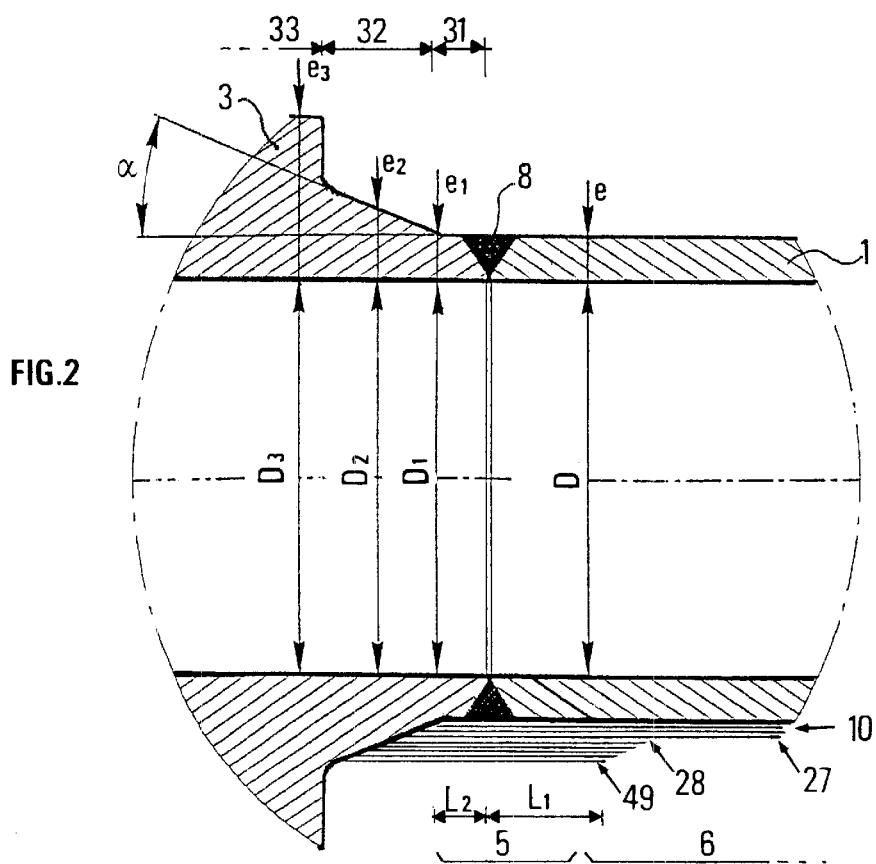
FIG. 2 shows the transition zone of the first end of a hooped tube, on the female connection side.

FIG. 2 shows more in detail first transition zone 5. Metal tube 1 is connected to connection 3 by weld 8. In the vicinity of weld 8, the metal thickness e and the diameter D of tube 1 are similar to the metal thickness e1 and to the diameter D1 of connection 3. Eighteen hooping layers (from layer 10 to layer 27) can cover current zone 6 and first transition zone 5. Layer 10 is deposited directly on metal tube 1, layer 27 is the outer surface of the hooped tube. Prior to winding layer 10, the metal tube can be subjected to a surface preparation operation, of << Rilsan >> type for example, to provide good adhesion of layer 10 to metal tube 1. The tension applied in the layers ranges evenly from 2400 N for layer 10 to 2320 N for layer 27. In order to increase the internal pressure resistance in the vicinity of weld 8, additional hooping layers are deposited on first transition zone 5. Twenty-two hooping layers (from layer 28 to layer 49) can be deposited in the vicinity of weld 8 and above hooping layers 10 to 27. Additional hooping layers 28 to 49 cover first transition zone 5. Layer 28 is deposited on layer 27 and layer 49 is the outer surface of the hooped tube at the level of first transition zone 5. The tension applied in layers 28 to 49 can be 1000 N. For example, hooping layers 28 to 49 can stretch from weld 8 over a length L1 at least equal to 50 mm on the side of metal tube 1, and over a length L2 at least equal to 25 mm on the side of connection 3. Beyond length L1 on tube 1, the number of additional layers 28 to 49 progressively decreases from twenty-two to zero. On tube 1, layer 49 located outside stretches the least far, layer 28 stretches the furthest.

Connection 3 can be divided in three parts having each at least one distinct function.

Part 31 is the end of connection 3 that is welded to tube 1. In FIG. 2, part 31 stretches over length L2 from weld 8. The geometry of part 31 is similar to the geometry of tube 1: the inside diameter D1 and the metal thickness e1 of part 31 are substantially identical to inside diameter D and metal thickness e of tube 1. Part 31 is hooped by layers 10 to 49 described above. Metal thickness e1 and the number of hooping layers are so selected that the internal pressure resistance of part 31 is higher than the internal pressure resistance of current zone 6.

The function of part 33 of connection 3 is notably to cooperate with another connection. Part 33 is not hooped. The metal thickness e3 of part 33 is so selected that the internal pressure resistance of part 33 is at least equal to the internal pressure resistance of current zone 6. In FIG. 2, the inside diameter D3 of part 33 is similar to inside diameter D1 of part 31 and metal thickness e3 of part 33 is greater than metal thickness e1 of part 31.

Part 32 is the part of connection 3 located between part 31 and part 33. The function of part 32 is to provide the transition between part 31, which has a metal thickness e1 and a hooping consisting of forty layers, and non-hooped part 33 which has a metal thickness e3 greater than e1. On part 32, the invention provides a progressive increase of metal thickness e2 and, simultaneously, a progressive decrease of the number of hooping layers. Thus, the increase of metal thickness e2 and the decrease of the number of hooping layers are so selected that the internal pressure resistance of part 32 is constantly at least equal to the internal pressure resistance of current zone 6. Progressive transition from the geometry of part 31 to the geometry of part 33 prevents stress concentrations. In FIG. 2, the diameter D2 of part 32 is substantially identical to diameters D1 and D3 of parts 31 and 33. At the interface between part 31 and 32, the metal thickness e2 of part 32 is substantially equal to the metal thickness e1 of part 31. The further from the interface between part 31 and 32, the more metal thickness e2 increases. The outer surface of part 32 can be a cone of angle α. The inside of part 32 is a cylinder of diameter D2. This increase of metal thickness e2 is accompanied by a progressive decrease in the number of hooping layers. The number of hooping layers decreases progressively from forty layers at the level of the interface between part 31 and part 32 to zero layer when metal thickness e2 is sufficient to withstand the internal pressure.

Figure 3:
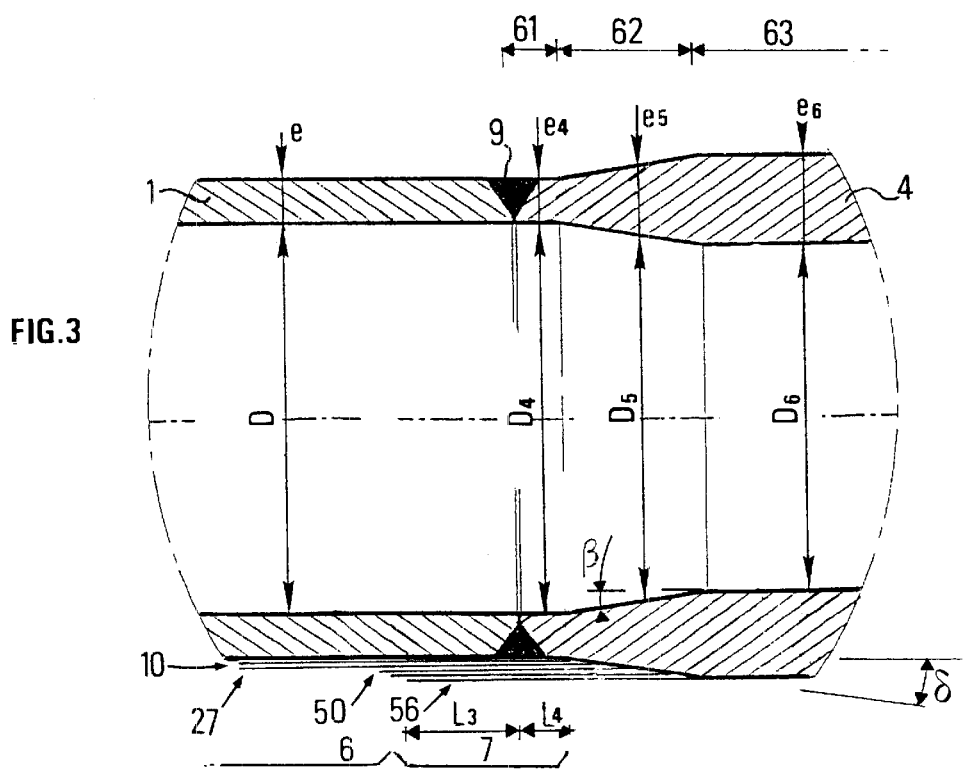
FIG. 3 shows the transition zone of the second end of a hooped tube, on the male connection side.

FIG. 3 shows in detail second transition zone 7. Metal tube 1 is connected to connection 4 by weld 9. In the vicinity of weld 9, the metal thickness e and the diameter D of tube 1 are identical to metal thickness e4 and to diameter D4 of connection 4. Eighteen hooping layers 10 to 27, described above in connection with FIG. 2, cover current zone 6 and second transition zone 7. In order to increase the internal pressure resistance in the vicinity of weld 9, additional hooping layers are deposited on second transition zone 7. For example, in the vicinity of weld 9 and above hooping layers 10 to 27, seven hooping layers (from layer 50 to layer 56) are deposited. The seven additional hooping layers 50 to 56 cover second transition zone 7. Layer 50 is deposited on layer 27 and layer 56 is the outer surface of the hooped tube at the level of second transition zone 7. The tension applied in layers 50 to 56 can be 1000 N. For example, hooping layers 50 to 56 can stretch from weld 9 over a length L3 at least equal to 50 mm on the side of metal tube 1 and over a length L4 at least equal to 25 mm on the side of connection 3. Beyond length L3, the number of additional layers 50 to 56 decreases progressively from seven to zero. On tube 1, layer 56 located outside stretches the least far, layer 50 stretches the furthest on tube 1.

Connection 4 can be divided in three parts having each at least one distinct function. Parts 61, 62 and 63 of connection 4 are respectively similar to parts 31, 32 and 33 of connection 3.

Part 61 is the end of connection 4 that is welded to tube 1. In FIG. 3, part 61 stretches over length L4 from weld 9. The geometry of part 61 is substantially identical to the geometry of tube 1: the inside diameter D4 and the metal thickness e4 of part 61 are substantially identical to inside diameter D and metal thickness e of tube 1. Part 61 is hooped by layers 10 to 27 and 50 to 56 described above. Metal thickness e4 and the number of hooping layers are so selected that the internal pressure resistance of part 61 is higher than the internal pressure resistance of current zone 6.

The function of part 63 of connection 4 is notably to cooperate with another element. Part 63 is not hooped. The metal thickness e6 of part 63 is so selected that the internal pressure resistance of part 63 is at least equal to the internal pressure resistance of current zone 6. In FIG. 3, inside diameter D6 of part 63 is smaller than inside diameter D4 of part 61, and metal thickness e6 of part 63 is greater than metal thickness e4 of part 61.

Part 62 is the part of connector 4 located between part 61 and part 63. The function of part 62 is to provide the transition between part 61, which has a metal thickness e4 and a hooping consisting of twenty-five layers, and non-hooped part 63 whose metal thickness e6 is greater than e4. In part 62, the invention provides a progressive increase of metal thickness e5 and, simultaneously, a progressive decrease of the number of hooping layers. Thus, the increase of metal thickness e5 and the decrease in the number of hooping layers are so selected that the internal pressure resistance of part 62 is constantly at least equal to the internal pressure resistance of current zone 6. The progressive transition from the geometry of part 61 to the geometry of part 63 prevents stress concentrations. In FIG. 3, the diameter D5 and the metal thickness e5 of part 62 vary. At the interface between parts 61 and 62, metal thickness e5 of part 62 is substantially equal to metal thickness e4 of zone 61, and diameter D5 is substantially equal to diameter D4. The further from part 61, the more metal thickness e5 increases and the more diameter D5 decreases. The inner surface of part 62 can consist of a cone of angle β. The outer surface of part 62 can consist of a cone of angle δ. This increase of metal thickness e5 is accompanied by a progressive decrease in the number of hooping layers. On part 62, the number of hooping layers decreases progressively from twenty-five layers in the vicinity of the interface between part 61 and part 62 to zero layer when thickness e5 is sufficient to withstand the internal pressure alone.

The outer surface of the pipe element according to the invention can be covered with a protective shell. This protective shell can be obtained by winding, i.e. an elongate element is wound around the tube with contiguous spires that stick to one another. The elongate element can be wound without tension. The elongate element can be made from a polyamide matrix containing glass fibers or Kevlar. The protective shell can also be used to give the external colouring of the hooped tube, white for example.

In FIG. 1, part 70 is a wearing part. Wearing part 70 is intended to cooperate with a female connection 3 of another pipe element and it is fastened to connection 4.

Wearing part 70 can be the female part of the link with connection 4. The wearing part is screwed onto connection 4. Seal elements 71, lip seals for example, are arranged between the inner surface of wearing part 70 and the outer surface of connection 4 to provide a sealed link.

The wearing part 70 of a first tube can be the male part of the link with the connection 3 of a second tube. Wearing part 70 is in contact with connection 3 through cylindrical surface 72. Sealing can also be provided by seals.

After a certain number of connections between pipe elements, the male connection may be damaged. In this case, wearing part 70 has to be changed, with the corresponding joints of female part 3.

What is claimed is:

1. A high-pressure pipe element comprising at least one hooping layer on a metallic core, wherein said core consists of a main part to which two connection means are welded at each end, in that said main part comprises a number of hooping layers for inducing a determined prestress in said core, and in that said pipe comprises additional hooping layers in a zone stretching on either side of the two welds.

2. A pipe element as claimed in claim 1, wherein said additional hooping layers stretch over at least 50 mm on said main part.

3. A pipe element as claimed in claim 1, wherein ends of said connection means are not hooped and have a sufficient thickness to withstand at least the same internal pressure as the hooped main part.

4. A pipe element as claimed in claim 3, wherein the outer surface of the connection means forms a cone between said main part and each one of said ends.

5. A pipe element as claimed in claim 4, wherein said cones are covered at least partly by the additional hooping layers.

6. A pipe element as claimed in claim 1, wherein said element is coated over the total outer surface thereof with a protective glass fiber layer embedded in a coloured polyamide matrix.

7. A pipe element as claimed in claim 1 used for manufacturing an auxiliary line of a drilling riser.

8. A pipe element as claimed in claim 7, wherein said auxiliary line is one of the following lines: kill line, choke line, booster line and mud return line.

* * * * *

UNITED STATES PATENT AND TRADEMARK OFFICE
CERTIFICATE OF CORRECTION

PATENT NO. : 6,536,480 B2
DATED : March 25, 2003
INVENTOR(S) : Guesnon et al.

It is certified that error appears in the above-identified patent and that said Letters Patent is hereby corrected as shown below:

<u>Title page, Item [54] and Column 1, lines 1 and 2,</u>
Title should read -- HIGH-PRESSURE PIPE ELEMENT MADE OF A HOOPED TUBE --

Signed and Sealed this

Twelfth Day of August, 2003

JAMES E. ROGAN
*Director of the United States Patent and Trademark Office*